(12) United States Patent
Sasage et al.

(10) Patent No.: US 7,985,293 B2
(45) Date of Patent: Jul. 26, 2011

(54) HYDRAULIC COMPOSITION

(75) Inventors: Yoshiaki Sasage, Joetsu (JP); Tsutomu Yamakawa, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 823 days.

(21) Appl. No.: 11/882,301

(22) Filed: Jul. 31, 2007

(65) Prior Publication Data

US 2008/0028993 A1    Feb. 7, 2008

(30) Foreign Application Priority Data

Aug. 1, 2006  (JP) ................ 2006-209587

(51) Int. Cl.
C04B 24/24    (2006.01)
(52) U.S. Cl. ......... 106/724; 106/726; 106/727; 106/730
(58) Field of Classification Search ................ 106/724, 106/726, 727, 730
See application file for complete search history.

(56) References Cited

U.S. PATENT DOCUMENTS

| | | | |
|---|---|---|---|
| 4,707,187 A | 11/1987 | Tsuda et al. | |
| 2003/0061970 A1 | 4/2003 | De Buen-Unna et al. | |
| 2006/0039233 A1* | 2/2006 | Farrington et al. | 366/8 |

FOREIGN PATENT DOCUMENTS

| | | | |
|---|---|---|---|
| BR | 9303522 | * | 6/1994 |
| BR | PR-9601518-7 A | | 9/1997 |
| EP | 200471 | * | 11/1986 |
| EP | 0 774 445 A1 | | 5/1997 |
| JP | 60-260451 A | | 12/1985 |
| JP | 61-270247 A | | 11/1986 |
| JP | 4-74748 A | | 3/1992 |
| JP | 5-294694 A | | 11/1993 |
| JP | 11-349367 A | | 12/1999 |
| JP | 2004-35374 A | | 2/2004 |
| JP | 2006-176394 A | | 7/2006 |

OTHER PUBLICATIONS

EP 200471 (Nov. 5, 1986) Bell et al. abstract only.*
BR 9303522 (Jun. 14, 1994) Katz de Castro abstract only.*
Japanese Office Action issued in corresponding Japanese Application No. 2006-209587 dated Nov. 11, 2009.
Japanese Office Action issued in corresponding Japanese Application No. 2006-209587 dated Sep. 10, 2008.

* cited by examiner

*Primary Examiner* — Paul Marcantoni
(74) *Attorney, Agent, or Firm* — Birch, Stewart, Kolasch & Birch, LLP

(57) ABSTRACT

A hydraulic composition is provided. This composition exhibits an improved workability in its coating with a trowel, and accordingly, an improved working efficiency with no adverse effects on its physical properties. The hydraulic composition comprises at least one surfactant selected from anionic surfactants having foaming ability (group A), at least one surfactant selected from surfactants which are nonionic antifoaming agents (group B), and a water-soluble cellulose ether. The surfactants of group A and group B are respectively added at 0.000005 to 0.004% by weight (solid content) in relation to the powder ingredients in the hydraulic composition, and the water-soluble cellulose ether is added at 0.02 to 1.2% by weight of the hydraulic composition.

8 Claims, No Drawings

HYDRAULIC COMPOSITION

CROSS-REFERENCE TO RELATED APPLICATION

This non-provisional application claims priority under 35 U.S.C. §119(a) on Patent Application No. 2006-209587 filed in Japan on Aug. 1, 2006, the entire contents of which are hereby incorporated by reference.

TECHNICAL FIELD

This invention relates to a hydraulic composition such as plastering and tile mortar including lightweight mortar and repair mortar. More specifically, this invention relates to a hydraulic composition which exhibits an improved workability in its coating with a trowel, and hence, an improved working efficiently in the coating.

BACKGROUND ART

Workability in the coating with a trowel of a hydraulic composition such as plastering material has been realized by adding a natural seaweed glue such as the one prepared form Chondrus ocellatus. Since the development of methylcellulose (a semi-synthetic resin), it has been commonly used for providing the workability.

The properties required for the hydraulic composition include good workability (ease of coating and finishing), high water retention (prevention of curing failure caused, for example, by drying out), and resistance to sagging (moving) (prevention of the coated mortal from deformation by its own weight and prevention of adhered tile from moving), and even severer requirements are imposed with the recent streamlining of the workplace.

JP-A 11-349367 (Patent Document 1) discloses a method for use in the field of concretes, and this method uses a combination of AE (air entraining) agent which is an anionic surfactant and a shrinkage reducing agent such as a polyoxyalkylene copolymer. When the content disclosed in the JP-A 11-349367 for the concretes is used in the present invention, the excessively high content results in the significant loss of workability as well as inferior properties of the cured product, and the object of the present invention is never realized.

DISCLOSURE OF THE INVENTION

The present invention has been completed in view of the situation as described above, and an object of the present invention is to provide a hydraulic composition which exhibits an improved workability in its coating with a trowel, and hence, an improved working efficiency with no adverse effects on its physical properties.

In order to realize such object, the inventors of the present invention made an intensive study and found that workability in the coating of the hydraulic composition with a trowel is markedly improved by the combination of a foaming anionic surfactant with an antifoaming agent which is a nonionic surfactant. The present invention has been completed on the basis of such finding.

Accordingly, the present invention provides a hydraulic composition comprising at least one surfactant selected from anionic surfactants having foaming ability (group A); at least one surfactant selected from surfactants which are nonionic antifoaming agents (group B); and a water-soluble cellulose ether. In this composition, the surfactant of group A and the surfactant of group B are respectively added at 0.000005 to 0.004% by weight (solid content) in relation to the entire powder ingredients of the hydraulic composition, and the water-soluble cellulose ether is added at 0.02 to 1.2% by weight of the hydraulic composition.

EFFECTS OF THE INVENTION

The present invention is capable of remarkably improving workability in its coating with a trowel without adversely affecting water retention or strength properties of the hydraulic composition.

DESCRIPTION OF THE PREFERRED EMBODIMENTS

Next, the present invention is described in detail.

The present invention relates to a hydraulic composition which contains an anionic surfactants having foaming ability (a group A surfactant) and a surfactants which is a nonionic antifoaming agent (a group B surfactant). When the surfactant having foaming ability is added to a hydraulic composition, weight per unit volume of the resulting hydraulic composition is normally reduced, and workability in its coating with a trowel will be improved with sacrifice in water retention and strength of the hydraulic composition itself. On the other hand, when the surfactant which is an antifoaming agent is solely added, the resulting hydraulic composition will have an increased weight per unit volume, and workability in its coating with a trowel will be greatly reduced.

The mechanism involved in the present invention is not yet fully resolved. However, it is unlikely that the workability is improved solely by simple control of the amount of air trapped in the composition by the combination of the foaming agent and the antifoaming agent, and improvement in the surface property of the powder ingredients by the adsorption of the surfactants to the inorganic powder is more likely to be closely involved.

Examples of the anionic surfactant having foaming ability (group A surfactant) used in the hydraulic composition of the present invention include fatty acid soap surfactants, amide ether sulfate surfactants, dodecyl benzenesulfonate surfactants, lauryl acid surfactants, lauryl sulfate surfactants, lauroyl sarcosinate surfactants, sulfosuccinic acid surfactants, alkyl sulfate surfactants, and alkyl ether sulfate surfactants, which are typically added at an amount in solid content of 0.000005 to 0.004% by weight, preferably 0.00001 to 0.0035% by weight, and more preferably 0.00005 to 0.003% by weight in relation to the powder ingredients. When the content of the anionic surfactant having foaming ability is less than 0.000005% by weight, improvement of the workability is not recognized, and incorporation in excess of 0.004% by weight invites excessive inclusion of the air in the hydraulic composition resulting in the loss of strength.

Examples of the surfactant which is a nonionic antifoaming agent (group B surfactant) include polyether surfactants, silicone surfactants, alcohol surfactants, mineral oil surfactants, and vegetable oil surfactants, which are typically added at an amount of 0.000005 to 0.004% by weight, preferably 0.00001 to 0.0035% by weight, and more preferably 0.00005 to 0.003% by weight in solid content in the powder ingredients. When the content the surfactant which is a nonionic antifoaming agent is less than 0.000005% by weight, improvement of the workability is not recognized, and incorporation in excess of 0.004% by weight invites excessively reduced inclusion of the air in the hydraulic composition resulting in the loss of workability.

The surfactant which is a nonionic antifoaming agent (the group A surfactant) and the surfactant which is a nonionic antifoaming agent (the group B surfactant) are added at a weight ratio (solid content) of A/B of 10/90 to 90/10, preferably at 20/80 to 80/20, and more preferably at 30/70 to 70/30. When these surfactants are incorporated at a ratio outside the range as described above, namely, at a ratio outside the range of 10/90 to 90/10, strength of the hydraulic composition will be lost by the excessive amount of bubbles generated by the group A surfactant, or workability will be greatly reduced by the failure of the entrainment of the air which should have been included in the hydraulic composition, since the content of the group B surfactant becomes too much.

Since the surfactants are incorporated at an extremely minute amount, the surfactants of groups A and B may be incorporated by impregnating in an inorganic support such as a silica based fine powder or an organic support such as a cellulose ether. Exemplary silica based fine powders used for the support of the surfactant include amorphous silicon dioxide such as white carbon, porous silicon dioxide such as diatomaceous earth, and porous silicic acid calcium. Examples of the cellulose ether used for the support of the surfactant include water-soluble alkylcellulose, water-soluble hydroxyalkylcellulose, and the water-soluble hydroxyalkylalkylcellulose as will be described below.

In this case, the surfactant and the organic or inorganic support are preferably used at a weight ratio (solid content) of 30/70 to 5/95.

The hydraulic composition of the present invention also contains a water-soluble cellulose ether which imparts water retention property and plasticity with the composition. Exemplary water-soluble cellulose ethers include water-soluble alkylcelluloses such as methylcellulose, hydroxypropyl methylcellulose, and hydroxyethylmethylcellulose; water-soluble hydroxyalkylcelluloses such as hydroxyethylcellulose and hydroxypropylcellulose; and water-soluble hydroxyalkylalkylcellulose such as hydroxyethylethylcellulose. The water-soluble cellulose ether may be added at an amount of 0.02 to 1.2% by weight, preferably 0.03 to 0.7% by weight, and more preferably 0.04 to 0.55% by weight of the entire composition. When the water-soluble cellulose ether is added at an amount less than 0.02% by weight, water retention of the resulting composition will be insufficient, and due to the resulting drying out and insufficient plasticity, the composition will suffer from insufficient adhesion to the underlying substrate, and after the curing, from peeling of the coated composition from the underlying substrate. On the contrary, addition at an amount in excess of 1.2% by weight will invite unduly increased viscosity which results in the failure of improving the workability as well as economical disadvantage.

The water-soluble cellulose ether preferably has a viscosity as measured at 20° C. for 1% by weight aqueous solution by a model B or Brookfield viscometer at 20 rpm of 5 to 30,000 mPa·s, more preferably 10 to 10,000 mPa·s, and more preferably 15 to 7,000 mPa·s. When the viscosity is less than 5 mPa·s, water retention of the hydraulic composition may be insufficient, and when the viscosity is in excess of 30,000 mPa·s, the hydraulic composition will have an excessively high viscosity, and improvement of the workability can not be expected.

The hydraulic composition of the present invention may also contain a cement, gypsum, fine aggregates, an inorganic extender, an organic extender, water, and the like in addition to the components as described above.

Exemplary cements used include normal Portland cement, high early strength Portland cement, moderate heat Portland cement, blast furnace cement, silica cement, fly ash cement, alumina cement, and jet cement, and the cement may be partly or entirely replaced with gypsum such as gypsum hemihydrate. If necessary, anhydrous gypsum or dehydrate gypsum may be added for adjusting coagulation. The cement or the gypsum may be added at 15 to 85 parts by weight, preferably at 20 to 80 parts by weight, and more preferably 25 to 75 parts by weight. (The amount indicated in parts by weight in relation to 100 parts by weight of the total of the cement, the gypsum, the fine aggregates, and the extender. For other additives, the amount is indicated in % by weight in relation to 100 parts by weight of the total amount as described above). When the amount is less than 15 parts by weight, the curing may be significantly retarded or absent. When the amount is in excess of 85 parts by weight, shrinking upon drying or self-shrinkage may take place, and cracks may be formed on the surface after curing.

Exemplary preferable fine aggregates include river sand, mountain sand, sea sand, and ground sand, or fine aggregates for plastering. These fine aggregates may have a particle size of up to 5 mm, preferably up to 2 mm, and more preferably up to 1 mm. The fine aggregates are preferably added at 85 to 15 parts by weight, preferably at 80 to 20 parts by weight, and more preferably at 75 to 25 parts by weight. The fine aggregates may be partly replaced with an inorganic or organic extender, and exemplary such inorganic extenders include fly ash, blast furnace slug, talc, calcium carbonate, marble dust (lime stone powder), pearlite, and shirasu balloons, and the inorganic extender typically has a particle size of up to 5 mm. Exemplary organic extenders include styrene foam beads, and pulverized ethylene vinyl alcohol foam, and the organic extender typically has a particle size of up to 10 mm.

The hydraulic composition may also contain a synthetic polymer such as polyvinyl alcohol, polyethylene oxide, polyethylene glycol, or polyacrylamide, a natural polymer such as pectin, gelatin, casein, welan gum, gellan gum, locust bean gum, guar gum, or a starch derivative, and other reinforcements which has the effect of preventing the composition from sagging and moving, as a content that does not adversely affect the physical properties of the hydraulic composition.

The hydraulic composition of the present invention is used by adding water to the composition, and kneading the mixture by the method commonly used in the art. The water is added at an amount that does not adversely affect strength and physical properties of the hydraulic composition.

EXAMPLES

Next, the present invention is described in further detail by referring to the Examples which by no means limit the scope of the present invention.

[Materials Used]
Cement: Normal Portland cement
  (manufactured by Taiheiyo Materials Corporation)
Gypsum hemihydrate:
  Reagent (manufactured by Wako Pure Chemical Industries, Ltd.)
Mikawa silica sand:
  Nos. 5 and 6 (manufactured by Mikawa Silica Sand)
Fly ash: Commercially available product (manufactured by Joban Fly Ash)
Calcium carbonate:
  Reagent (manufactured by Wako Pure Chemical Industries, Ltd.)
Styrene foam beads:
  Particle size, 1 mm or less Redispersible powder resin:
LDM7100P (manufactured by Nichigo Mowinyl Co., Ltd.)
Anionic foaming agent (surfactant): shown in Table 1
Nonionic antifoaming agent (surfactant): shown in Table 2
Water-soluble cellulose ether: shown in Table 3

TABLE 1

| Reagent No. | Type | Composition | Manufacturer |
|---|---|---|---|
| A-1 | Lipon | Alkylaryl sulfate | Lion Corporation |
| A-2 | Emal | Alkyl sulfate | Kao Corporation |
| A-3 | Sunamide | Amide ether sulfate | NOF Corporation |
| A-4 | Persoft | Alkylether sulfate | NOF Corporation |
| A-5 | Nonsoul | Fatty acid soap | NOF Corporation |

TABLE 2

| Reagent No. | Type | Composition | Manufacturer |
|---|---|---|---|
| B-1 | Nopco PD-1 | Mineral oil base | San Nopco |
| B-2 | Pluronic L61 | Polyoxyalkylene glycol | Adeca Corporation |
| B-3 | KM73 | Modified silicone | Shin-Etsu Chemical Co., Ltd. |

The surfactants shown in Tables 1 and 2 were used after impregnating in a silica fine powder (the surfactant/silica (weight ratio of the solid content), 50/50).

TABLE 3

| Reagent No. | Composition | Degree of substitution OMe (DS) | Degree of substitution OHP (MS) | Degree of substitution OHE (MS) | Viscosity of 1 wt % aqueous solution (mPa·s) | Manufacturer |
|---|---|---|---|---|---|---|
| C-1 | MC | 1.8 | — | — | 6.2 | Shin-Etsu Chemical Co., Ltd. |
| C-2 | HPMC | 1.4 | 0.20 | — | 29,000 | Shin-Etsu Chemical Co., Ltd. |
| C-3 | HPMC | 1.4 | 0.20 | — | 310 | Shin-Etsu Chemical Co., Ltd. |
| C-4 | HEC | — | — | 2.20 | 9,580 | SE Tylose |
| C-5 | HPMC | 1.4 | 0.20 | — | 2,300 | Shin-Etsu Chemical Co., Ltd. |
| C-6 | HEMC | 1.5 | — | 0.30 | 5,200 | Shin-Etsu Chemical Co., Ltd. |

HPMC: hydroxypropylmethylcellulose (a hydroxyalkylalkylcellulose)
HEMC: hydroxyethylmethylcellulose (a hydroxyalkylalkylcellulose)
HEC: hydroxyethylcellulose (a hydroxyalkylcellulose)
MC: methylcellulose (an alkylcellulose)

Examples 1 to 10 and Comparative Examples 1 to 5

The materials as described above were mixed at the proportion shown in Tables 4 to 8 to produce a hydraulic composition. Experiments were conducted by using the thus prepared composition to evaluate table flow, workability, water retention, and flexural strength. The results are shown in Tables 4 to 8.

In the Tables 4 to 8 as described below, amount of the reagents A, B, and C is the amount of the solid content of the reagent in relation to the powder ingredients (for example, water and ingredients other than the reagents A to C), and amount of the water added is the amount in solid content of the water in relation to the ingredients other than the reagents A to C. It is to be noted that the ratio of the reagent A/the reagent B is measured in terms of the solid content.

TABLE 4

| | | Example | | | | |
|---|---|---|---|---|---|---|
| Experiment No. | | 1 | 2 | 3 | 4 | 5 |
| Composition | Cement (g) | 1,000 | 1,000 | 1,000 | 1,000 | 1,000 |
| | Silica sand (g) | 1,000 | 1,000 | 1,000 | 1,000 | 1,000 |
| | Type of reagent A | A-1 | A-2 | A-3 | A-4 | A-5 |
| | Amount of reagent A (% by weight) | 0.004 | 0.0035 | 0.00022 | 0.003 | 0.00006 |
| | Type of reagent B | B-3 | B-1 | B-2 | B-1 | B-2 |
| | Amount of reagent B (% by weight) | 0.00049 | 0.00093 | 0.00022 | 0.0013 | 0.00013 |
| | Reagent A/Reagent B | 89/11 | 79/21 | 50/50 | 69/31 | 31/69 |
| | Type of reagent C | C-1 | C-2 | C-3 | C-4 | C-5 |
| | Amount of reagent C (% by weight) | 0.45 | 0.10 | 0.22 | 0.20 | 0.20 |
| | Water (% by weight) | 23.2 | 20.3 | 21.0 | 21.8 | 20.4 |

TABLE 4-continued

|  |  | Example | | | | |
|---|---|---|---|---|---|---|
|  | Experiment No. | 1 | 2 | 3 | 4 | 5 |
| Experimental results | Table flow (mm) | 162 | 166 | 165 | 166 | 169 |
|  | Workability (coating ability) | 5 | 5 | 5 | 5 | 5 |
|  | Water retention (%) | 94.6 | 92.4 | 93.5 | 91.2 | 94.8 |
|  | Flexural strength (N/mm$^2$) | 6.5 | 6.8 | 6.7 | 6.2 | 6.5 |

TABLE 5

|  |  | Example | | |
|---|---|---|---|---|
|  | Experiment No. | 6 | 7 | 8 |
| Composition | Cement (g) | 1,000 | 1,000 | 600 |
|  | Silica sand (g) | 1,000 | 1,000 | — |
|  | Calcium carbonate (g) | — | — | 50 |
|  | Fly ash (g) | — | — | 260 |
|  | Styrene foam beads (L) | — | — | 5.5 |
|  | Redispersible powder resin (g) | — | — | 2.0 |
|  | Type of reagent A | A-5 | A-3 | A-3 |
|  | Amount of reagent A (% by weight) | 0.000049 | 0.000006 | 0.002 |
|  | Type of reagent B | B-3 | B-2 | B-2 |
|  | Amount of reagent B (% by weight) | 0.000013 | 0.000049 | 0.002 |
|  | Reagent A/Reagent B | 79/21 | 11/89 | 50/50 |
|  | Type of reagent C | C-6 | C-3 | C-5 |
|  | Amount of reagent C (% by weight) | 0.15 | 0.15 | 1.0 |
|  | Water (% by weight) | 20.6 | 20.6 | 21.0 |
| Experimental results | Table flow (mm) | 168 | 168 | 165 |
|  | Workability (coating ability) | 4 | 3 | 5 |
|  | Water retention (%) | 92.1 | 93.1 | 98.0 |
|  | Flexural strength (N/mm$^2$) | 6.6 | 6.6 | 0.6 |

TABLE 6

|  |  | Example | |
|---|---|---|---|
|  | Experiment No. | 9 | 10 |
| Composition | Cement (g) | 800 | — |
|  | Hemihydrate gypsum (g) | 200 | 1,500 |
|  | Silica sand (g) | 1,000 | — |
|  | Calcium carbonate (g) | — | 500 |
|  | Type of reagent A | A-1 | A-4 |
|  | Amount of reagent A (% by weight) | 0.004 | 0.003 |
|  | Type of reagent B | B-3 | B-1 |
|  | Amount of reagent B (% by weight) | 0.00049 | 0.0013 |
|  | Reagent A/Reagent B | 89/11 | 69/31 |
|  | Type of reagent C | C-1 | C-4 |
|  | Amount of reagent C (% by weight) | 0.45 | 0.20 |
|  | Water (% by weight) | 25.0 | 44.0 |
| Experimental results | Table flow (mm) | 160 | 140 |
|  | Workability (coating ability) | 5 | 5 |
|  | Water retention (%) | 95.6 | 67.5 |
|  | Flexural strength (N/mm$^2$) | 5.3 | 3.0 |

TABLE 7

|  |  | Comparative Example | | |
|---|---|---|---|---|
|  | Experiment No. | 1 | 2 | 3 |
| Composition | Cement (g) | 1,000 | 1,000 | 1,000 |
|  | Silica sand (g) | 1,000 | 1,000 | 1,000 |
|  | Type of reagent A | — | A-1 | — |
|  | Amount of reagent A (% by weight) | — | 0.03 | — |
|  | Type of reagent B | — | — | B-2 |
|  | Amount of reagent B (% by weight) | — | — | 0.2 |
|  | Type of reagent C | C-3 | C-3 | C-3 |
|  | Amount of reagent C (% by weight) | 0.22 | 0.22 | 0.22 |
|  | Water (% by weight) | 21.0 | 20.4 | 21.5 |
| Experimental results | Table flow (mm) | 162 | 164 | 163 |
|  | Workability (coating ability) | 3 | 4 | 1 |
|  | Water retention (%) | 94.0 | 84.1 | 80.2 |
|  | Flexural strength (N/mm$^2$) | 6.2 | 3.8 | 7.3 |

TABLE 8

|  |  | Comparative Example | |
|---|---|---|---|
|  | Experiment No. | 4 | 5 |
| Composition | Cement (g) | 600 | — |
|  | Hemihydrate gypsum (g) | — | 1,500 |
|  | Silica sand (g) | — | — |
|  | Calcium carbonate (g) | 50 | 500 |
|  | Fly ash (g) | 260 | — |
|  | Styrene foam beads (L) | 5.5 | — |
|  | Redispersible powder resin (g) | 2.0 | — |
|  | Type of reagent A | — | — |
|  | Amount of reagent A (% by weight) | — | — |
|  | Type of reagent B | B-2 | B-4 |
|  | Amount of reagent B (% by weight) | 0.2 | 0.2 |
|  | Type of reagent C | C-1 | C-4 |
|  | Amount of reagent C (% by weight) | 1.0 | 0.20 |
|  | Water (% by weight) | 21.0 | 43.0 |
| Experimental results | Table flow (mm) | 160 | 140 |
|  | Workability (coating ability) | 2 | 3 |
|  | Water retention (%) | 92.2 | 65.2 |
|  | Flexural strength (N/mm$^2$) | 0.7 | 3.1 |

(Evaluation Method)

The ingredients other than the water (i.e. the powders) were preliminarily mixed, and after introducing the powder mixture in a 5 liter mortar mixer, predetermined amount of water was added to the mixture with stirring and the kneading was continued for 3 minutes. The measurements as described below were thereafter conducted.

[Measurement]

(1) Table flow test

Table flow was measured according to JIS R 5201.

(2) Trowel workability

Sensory test: Average of the evaluation by a panel of three people are indicated. Normal workability was evaluated "3" while "5" indicates that the sample was easiest to coat, and "1" indicates that the sample was hardest to coat.

(3) Water retention

Water retention was measured according to JIS A 6916.

(4) flexural strength

The sample was prepared according to JIS R 5201, and cured according to JIS A 1171.

Japanese Patent Application No. 2006-209587 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A hydraulic composition for plastering or tile mortar comprising:
   at least one surfactant selected from the group consisting of anionic, surfactants having foaming ability (group A);
   at least one surfactant selected from the group consisting of surfactants which are nonionic antifoaming agents (group B); and
   a water-soluble cellulose ether, wherein
   the surfactant of group A is added at 0.000005 to 0.004% by weight (solid content) and the surfactant of group B is added at 0.000005 to 0.00093% by weight (solid content) in relation to the powder ingredients in the hydraulic composition, and
   the water-soluble cellulose ether is added at 0.02 to 1.2% by weight of the hydraulic composition;
   and further a hydraulic cement and water.

2. The hydraulic composition according to claim 1 wherein content of the group A and the group B is such that A/B is in the range of 10/90 to 90/10 on weight basis of the solid content.

3. The hydraulic composition according to claim 1 wherein the water-soluble cellulose ether is a water-soluble alkylcellulose, a water-solublehydroxyalkylalkylcellulose, or a water-soluble hydroxyalkylcellulose which has a viscosity measured at 20° C. by a model B or Brookfield viscometer at 20 rpm for 1% by weight aqueous solution of 5 to 30,000 mPa·s.

4. The hydraulic composition according to claim 1 wherein the surfactant of the group A and/or the group B is impregnated in a support which is a silica fine powder.

5. The hydraulic composition according to claim 1 wherein the surfactant of the group A and/or the group B is impregnated in a support which is a water-soluble cellulose ether.

6. The hydraulic composition according to claim 1 wherein the surfactant of group A is selected from the group consisting of alkylaryl sulfate, alkyl sulfate, amide ether sulfate, alkylether sulfate, and fatty acid soap, and the surfactant of group B is selected from the group consisting of mineral oil base, polyoxyalkylene glycol, and modified silicone.

7. The hydraulic composition according to claim 1 wherein the water-soluble cellulose ether is selected from the group consisting of hydroxypropylmethylcellulose, hydroxyethylmethylcellulose, hydroxyethylcellulose, and methylcellulose.

8. An additive composition for a hydraulic composition, which comprises:
   at least one surfactant selected from anionic surfactants having foaming (group A);
   at least one surfactant selected from surfactants which are nonionic antifoaming agents (group B); and
   a water-soluble cellulose ether, wherein
   the surfactant of group A, is added at 0.000005 to 0.004% by weight (solid content) and the surfactant of group B is added at 0.000005 to 0.00093% by weight (solid content) in relation to the powder ingredients, in the hydraulic composition, and the water-soluble cellulose ether is added at 0.02 to 1.2% by weight of the hydraulic composition.

\* \* \* \* \*